US011861562B2

(12) United States Patent
Massicotte et al.

(10) Patent No.: US 11,861,562 B2
(45) Date of Patent: Jan. 2, 2024

(54) REAL-TIME CANDIDATE MATCHING BASED ON A SYSTEM-WIDE TAXONOMY

(71) Applicant: Nespa, LLC, San Carlos, CA (US)

(72) Inventors: Serge Massicotte, San Carlos, CA (US); Eric Martel, Belmont, CA (US); John Sarvari, Suwanee, GA (US)

(73) Assignee: NESPA, LLC, San Carlos, CA (US)

( * ) Notice: Subject to any disclaimer, the term of this patent is extended or adjusted under 35 U.S.C. 154(b) by 413 days.

(21) Appl. No.: 16/589,638

(22) Filed: Oct. 1, 2019

(65) Prior Publication Data

US 2020/0160274 A1 May 21, 2020

Related U.S. Application Data

(60) Provisional application No. 62/770,681, filed on Nov. 21, 2018.

(51) Int. Cl.
*G06Q 10/1053* (2023.01)
*G06F 16/2457* (2019.01)
*G06N 20/00* (2019.01)

(52) U.S. Cl.
CPC ... *G06Q 10/1053* (2013.01); *G06F 16/24578* (2019.01); *G06N 20/00* (2019.01)

(58) Field of Classification Search
CPC .............. G06Q 10/1053; G06Q 50/01; G06F 16/24578
See application file for complete search history.

(56) References Cited

U.S. PATENT DOCUMENTS

| 8,156,051 B1 * | 4/2012 | Shah | G06Q 10/10 705/310 |
| 2012/0150761 A1 * | 6/2012 | Ananian | G06Q 10/1053 705/321 |
| 2013/0332381 A1 * | 12/2013 | Clark | G06Q 10/1053 705/321 |

(Continued)

OTHER PUBLICATIONS

Dave, Vachik S., et al. "A combined representation learning approach for better job and skill recommendation." Proceedings of the 27th ACM International Conference on Information and Knowledge Management. 2018. (Year: 2018).*

*Primary Examiner* — Lynda Jasmin
*Assistant Examiner* — Brendan S O'Shea
(74) *Attorney, Agent, or Firm* — Trellis IP Law Group, PC; Lisa Benado (57) ABSTRACT

Implementations generally relate to a method of matching job-seekers and employers in real-time with low required effort by the job-seekers and employers. A system-wide taxonomy is used in matching job-seekers and employers, thereby reducing the time for the recruiting process. Employers create a job position, and specify the relative importance of traits associated with the job position. Job-seekers answer profile questions (e.g. work experience), and the system uses the taxonomy to generate a list of job-seeker skills based on the answers to these questions. A list of job-seekers is then generated for the job position based on a mapping of the available job-seekers' skills and the employer rankings of the job position traits. A number of additional factors, like job seekers' in-app engagement, are used to further sort and filter the list of job-seekers.

22 Claims, 11 Drawing Sheets

(56) References Cited

U.S. PATENT DOCUMENTS

| | | | |
|---|---|---|---|
| 2014/0122355 A1* | 5/2014 | Hardtke | G06Q 10/105 |
| | | | 705/321 |
| 2016/0232160 A1* | 8/2016 | Buhrmann | G06Q 10/1053 |
| 2017/0161686 A1* | 6/2017 | Dyrvig | G06F 16/24578 |
| 2017/0344953 A1* | 11/2017 | Aggarwal | G06Q 10/02 |
| 2017/0371957 A1* | 12/2017 | Merhav | G06Q 50/01 |
| 2018/0060820 A1* | 3/2018 | Reuter | G06Q 10/1053 |
| 2018/0060823 A1* | 3/2018 | Garimella | G06Q 10/1053 |

* cited by examiner

REAL-TIME CANDIDATE MATCHING BASED ON A SYSTEM-WIDE TAXONOMY

CROSS REFERENCES TO RELATED APPLICATIONS

This application claims the benefit of U.S. Provisional Patent Application Ser. No. 62/770,681, entitled REAL-TIME MATCHING PROCESS FOR JOB POSTINGS BASED ON A SYSTEM-WIDE TAXONOMY, filed on Nov. 21, 2018, which is hereby incorporated by reference as if set forth in full in this application for all purposes.

BACKGROUND

For job recruitment, success can be dependent on the speed and efficiency in which communication and recruitment happens. Conventional methods for recruiting candidates can result in many candidates dropping out of the pipeline during the process. The implementations described herein facilitate the matching between recruiters and candidates and can provide other features related to job fulfillment.

SUMMARY

Embodiments comprise of a taxonomy which maps a list of jobs organized in a hierarchy by industry, vertical, or category to a list of job-seeker attributes. The job-seeker attributes may include, but are not limited to skills demanded of the job, tasks that are required to perform the job, personal attributes as observed through in-app questionnaires and in-app user behavior, such as timeliness of responses and attending confirmed appointments etc. Although specific job-seeker attributes or characteristics, such as a "skill," may be referred to in describing embodiments, it should be apparent that the functionality or processing may apply to other attributes or characteristics as well.

A further understanding of the nature and the advantages of particular embodiments disclosed herein may be realized by reference of the remaining portions of the specification and the attached drawings.

DETAILED DESCRIPTION OF EMBODIMENTS

Implementations generally relate to a method of matching job-seekers and employers in real-time with low required effort by the job-seekers and employers. As described in more detail herein, a system-wide taxonomy is used in matching job-seekers and employers, thereby reducing the time for the recruiting process. Employers create a job position and have the ability to assign relative weights to the top traits associated with the job position. Job-seekers answer profile questions (e.g. work experience), and the system uses the taxonomy to generate a list of job-seeker attributes based on the answers to these questions. A list of top candidates for the position is then generated from a matching process based on a mapping of the available job-seekers' attributes and the desired job position traits. The system uses machine learning to improve on its ranking of job-seekers based on how employers accept or reject candidates.

The matching process is facilitated by the system-wide taxonomy, which can be defined as having three components: a list of jobs organized by industries, verticals, and/or categories (e.g. a job within the retail industry and customer service category may be called "Office Manager"), a list of attributes agnostic of jobs, and a weighted mapping between the list of jobs and the list of attributes. This taxonomy allows for real-time communication within the application. The embodiments can result in a user experience which is simple, low-touch, and real-time since it may not require job-seekers to directly apply to job positions in order to be matched. For example, the recruiter can create a job posting and see candidates in less than a minute, while the job-seeker can log in and see relevant jobs in less than a minute.

For the purposes of the present discussion, a job-seeker may be any person who is searching for a job. The terms "job-seeker", "candidate", or "job candidate" may be employed interchangeably herein. An employer may be any entity or organization of persons who is seeking to hire for available job openings and may be used interchangeably with "recruiter".

Different types of job markets, such as "blue-collar", "white-collar", "services", "consulting" markets, may benefit in different ways from various embodiments or features described herein. For example, in the blue-collar job industry, which may be characterized by jobs involving manual labor or a service, the process of recruiting may benefit from a faster recruitment cycle. Although specific job markets may be discussed in the description of embodiments or features, the features may also be used in other job markets.

Software functionality may be any function, capability, or feature, e.g., stored or arranged data, that is provided via computer code, e.g., software. Generally, software functionality may be accessible via use of a user interface (UI), and accompanying user interface controls and features. Software functionality may include actions, such as retrieving data pertaining to a business object, calculating analytics, launching certain dialog boxes, performing searches, and so on.

In various implementations, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser or mobile application. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

For clarity, certain well-known components, such as hard drives, processors, operating systems, power supplies, routers, Internet service providers (ISPs), identity management systems, workflow orchestrators, process schedulers, integration brokers, tenant automation systems (TASs), online analytical processing (OLAP) engines, certain web services, virtual machines, middleware, databases, and so on, are not necessarily explicitly called out in the figures. However, those skilled in the art with access to the present teachings may know which components to implement and how to implement them to meet the needs of a given implementation.

Figure 1:
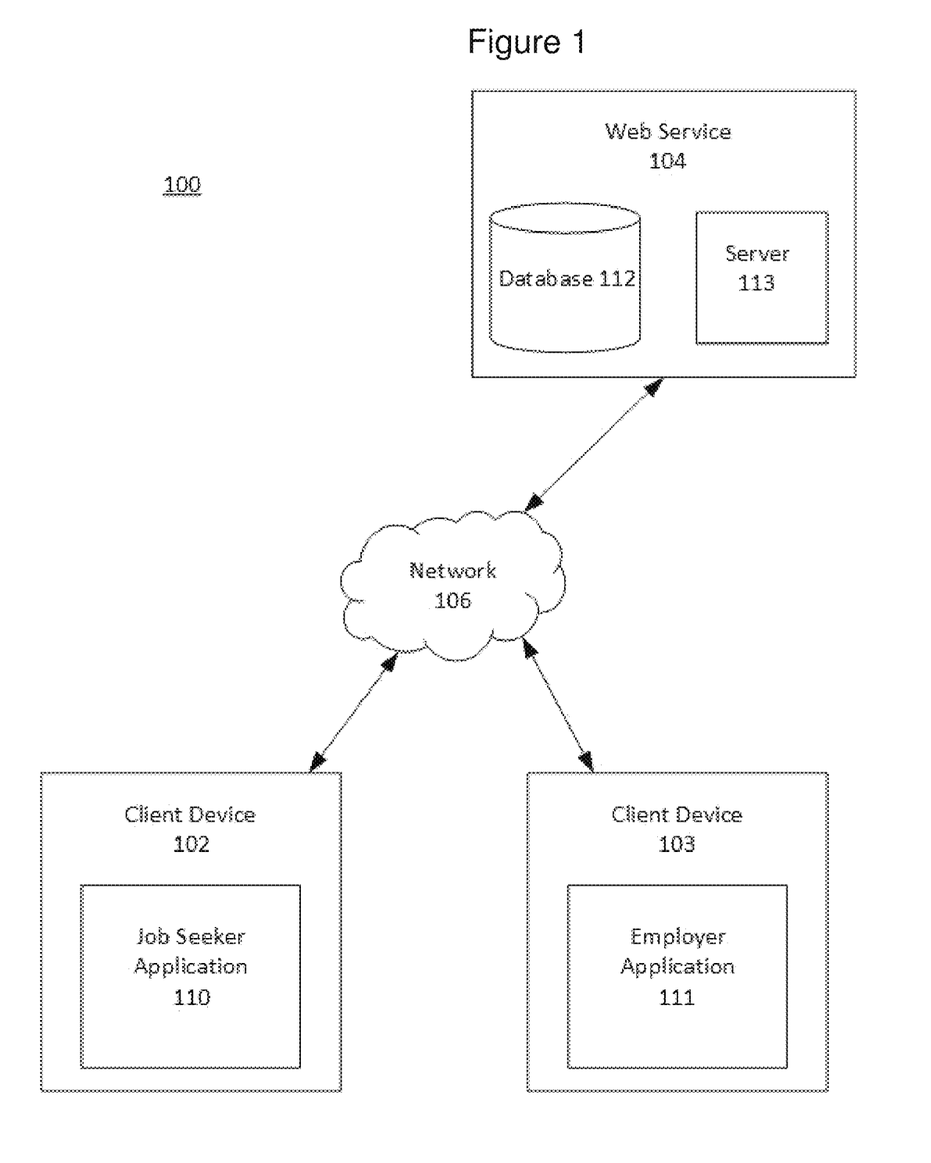
FIG. 1 Illustrates a block diagram of an example application environment.

FIG. 1 illustrates a block diagram of an example application environment 100, which may be used for implementations described herein. Shown are two client devices 102 and 103 and a web service 104. Client devices 102 and 103 may communicate with the web service 104 via network 106. In various implementations, client devices 102 and 103 may access services and data directly from web service 104. Web service 104 has an associated database 112 and server 113 for processing. Example implementations associated with application environment 100 are described in more detail herein. In other embodiments, different network and device arrangements, topologies or architectures can be used.

Employers and job-seekers may interact with the application from separate user interfaces (UIs) which are tailored to their needs. For example, client device 103 may have employer application 111 and client device 102 may have job-seeker application 110. The separation of the two different applications permits each application to be tailored for the specific needs of the job-seekers and employers (e.g. job-seekers may not post jobs and employers may not search for jobs). This separation also can encourage the job-seeker to not adjust their profile to match the needs of a specific job. Although there are two separate UIs for employers and job-seekers, they both use the same backend web service 104, which allows for real-time updates and interactions between the employers and job-seekers. In other embodiments, functionality provided by either the job-seeker or employer interfaces may be included in the other. The backend web service 104 utilizes a database 112 for storing application data and server 113 for performing calculations on the data. In some embodiments, there may be more than one web service used to communicate with the employer application 111 and job seeker application 110.

Figure 2:
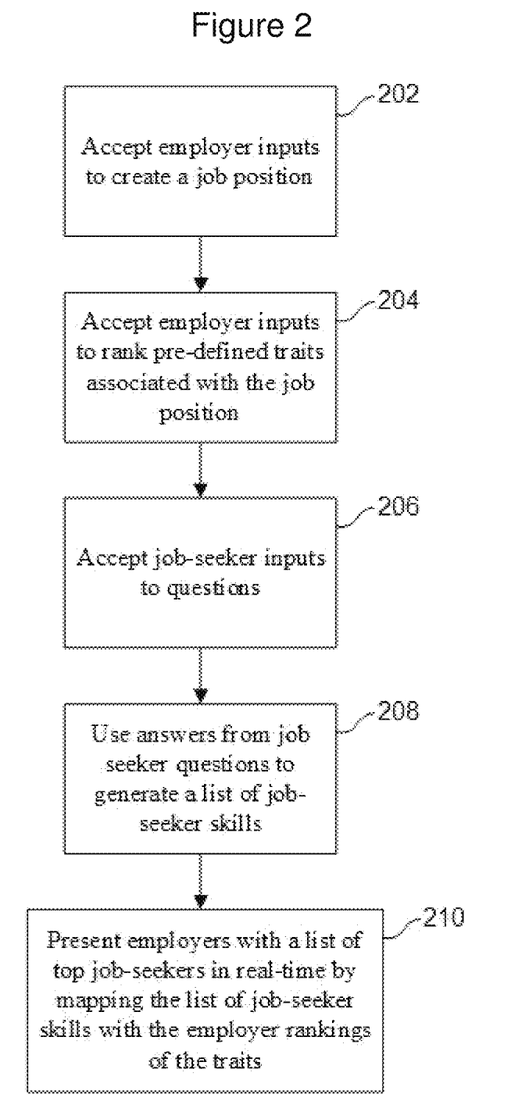
FIG. 2 Illustrates a flowchart for the process of matching job-seekers and job positions.

FIG. 2 illustrates an example flow diagram for the process of matching job-seekers and job positions. At block 202, the system such as client device 103 obtains employer-provided input from employer application 111 to create a new job position. At block 204, employer-provided input from employer application 111 is then accepted to rank pre-defined traits associated with the job position type. A job position type may refer to the task expected of the job (i.e. taxi driver or waiter). At block 206, the system such as client device 102 may obtain job-seeker input from job-seeker application 110 in response to profile questions. However, step 206 may not be required for the ranking to occur and can be omitted in some embodiments. At block 208, the job-seeker answers are used to generate a list of job-seeker skills. At block 210, a list of top job-seekers is presented to the employer in real time by mapping the list of job-seeker skills with the employer rankings of the pre-defined traits.

At block 210, the list of top job-seekers is generated by using candidate ranking. Since candidates do not directly apply to jobs, the ranking process can be critical to identifying good candidates. The ranking process can maximize the likelihood of top candidates accepting requests of interest from recruiters. The main driving factor for hiring success is the time to hire, since the probability of hiring decreases exponentially with time.

Figure 3:
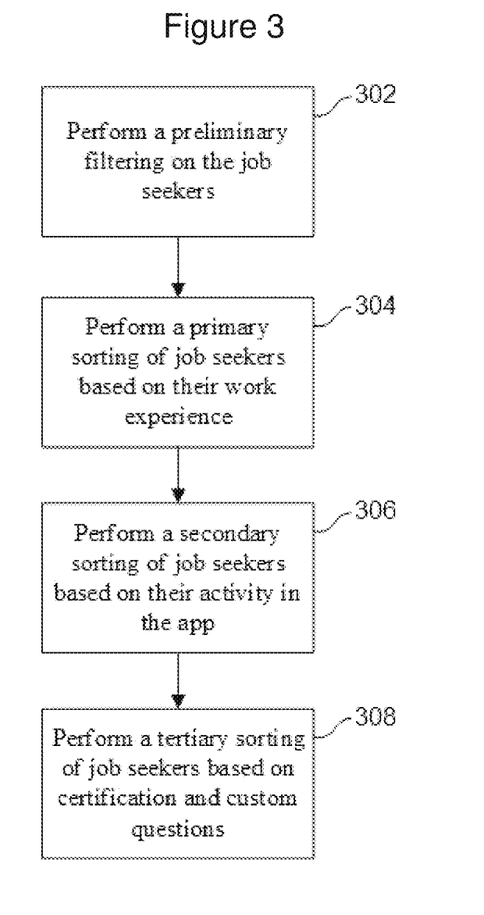
FIG. 3 illustrates an example flow diagram for candidate ranking.

FIG. 3 illustrates an example flow diagram for candidate ranking used at block 210 and performed at web service 104. At step 302, a preliminary filtering step is performed on the initial list of candidates. Candidates may be filtered based on a number of factors such as geographics, job type, availability (e.g. what hours the job-seeker is willing to work), and whether the candidate is still actively searching for a job. For example, recruiters may only see candidates that are located in their desired geographic area. Similarly, recruiters may only see candidates that match their availability requirements (e.g. part-time or full-time). If the recruiter is only searching for full-time employees, the job seekers who are available for full-time work may appear before those who are not available for full-time work, all else being equal between the candidates. In addition to these factors, candidate ranking may take into account other factors. The factors mentioned are not necessarily representative of all the factors that the candidate ranking process may use.

At step 304, the remaining candidates are sorted based on their work experience. The steps for sorting candidates based on their work experience is described in more detail in FIG. 4 and the related parts of the specification.

At step 306, a secondary sorting of candidates is performed based on their engagement with the application or in-app activity. The secondary sorting step takes into account a number of factors when sorting candidates, which may include: level of candidate responsiveness to requests from recruiters and notifications, candidate reliability in attending appointments, the number of "likes" the candidate has given within the application, and the time since the candidate last logged into the application. Requests from recruiters may include requests to schedule interviews, or to initiate general communication. Once general communication is accepted, the recruiter and candidate can communicate over text through the app or over the phone. Other requests may come in the form of notifications sent from the application. If candidates frequently click app notifications that they receive, they may be placed higher on the list of desired candidates. This list of factors used for secondary sorting is not meant to be comprehensive. The level of candidate activity may also be indicated by a number of other factors.

In some embodiments, step 306 may consider the level of candidate in-app activity within a predefined time period (e.g. 5 days). In some embodiments, this time period may be recruiter-defined. In other embodiments, the time period may be a default value set by the application.

At step 308, a tertiary sorting of candidates is performed based on their certifications and answers to recruiter-defined questions. For example, if all else is equal, candidates with required certifications appear before those without them. Similarly, if all else is equal, candidates who have answered positively to recruiter-defined questions (e.g. matching the recruiter-defined answer) can appear before those who have answered negatively (not matching the recruiter-defined answer).

Figure 4:
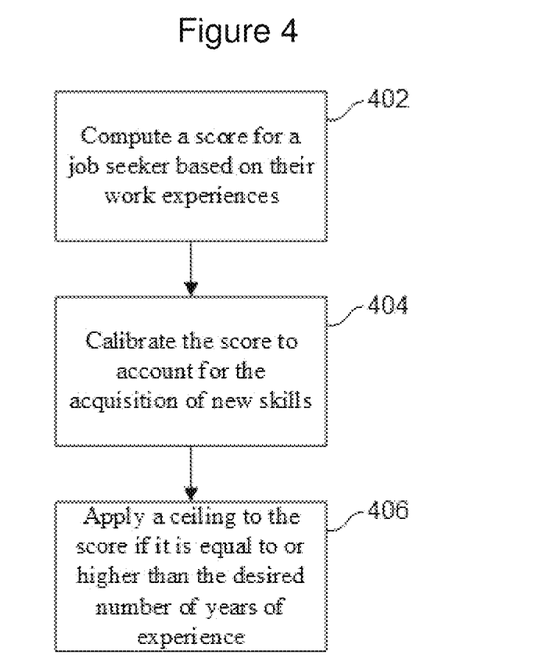
FIG. 4 illustrates an example flow diagram for the first step of candidate ranking.

FIG. 4 illustrates an example flow diagram for step 304 of the candidate ranking. At step 402, a score is computed for each job seeker based on their work experiences. These work experiences may be either direct or indirect work experiences. Work experiences are direct if the relevant position exactly matches one of the candidate's previous positions. Work experiences are indirect if the relevant position requires the same or similar skills as those required for one of the candidate's previous positions. The taxonomy determines which skills are important for a given position. For example, a candidate may be applying for a delivery driver position but only has experience as a taxi driver. Competence in driving motor vehicles is a common skill to both positions, so the candidate may be deemed to have indirect work experience. In some embodiments, both direct and indirect work experiences can be used to compute the job-seeker's score. In other embodiments, only direct work experiences can be used to compute the score. Machine learning can be used to improve the candidate ranking by taking into account employer feedback on the candidate ranking. In some embodiments, the system can use data on whether candidates' profiles are rejected or bookmarked by employers to improve the candidate ranking.

At step 404, the score is calibrated to account for the acquisition of new skills. The calibration may happen by applying a smoothing function to the score to account for skills that are new. At step 406, a ceiling is applied to the score if it is equal to or higher than the desired number of years of experience by the recruiter. For example, if the recruiter has requested 2 years of experience, a candidate with 2 years of experience and a candidate with 6 years of experience may receive the same score. Once the recruiter and job seeker are matched using candidate ranking, the recruiter may then initiate communication with the job seeker.

Figure 5:
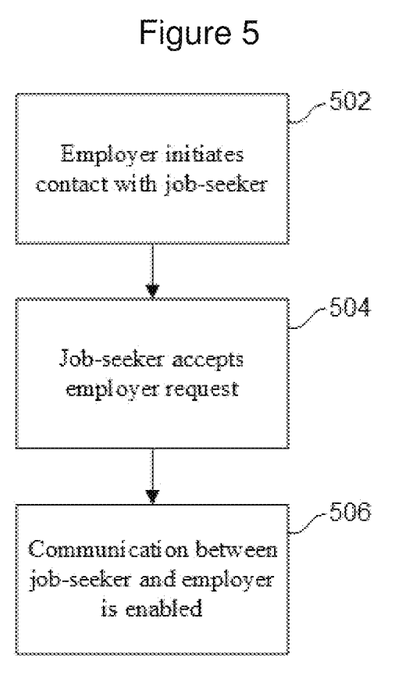
FIG. 5 Illustrates a flowchart for the communication process between employers and job-seekers.

FIG. 5 illustrates an example flow diagram for the communication process between employers and job-seekers. At block 502, the employer initiates contact with the job-seeker. At block 504, the job-seeker accepts the employer request. If the candidate has not responded to the employer request after a period of time, the system will automatically notify the candidate (e.g. by email). At block 506, communication between the job-seeker and employer is enabled. For example, the job-seeker and employer may communicate through a telephone call or schedule an appointment. In another embodiment, job-seekers may indicate their preference for a job position (e.g. by pressing a "like" button) and/or send a note to the employer to demonstrate interest in the job position. This enables the job-seeker to communicate with the employer without having first received a communication request from the employer.

Figure 6:
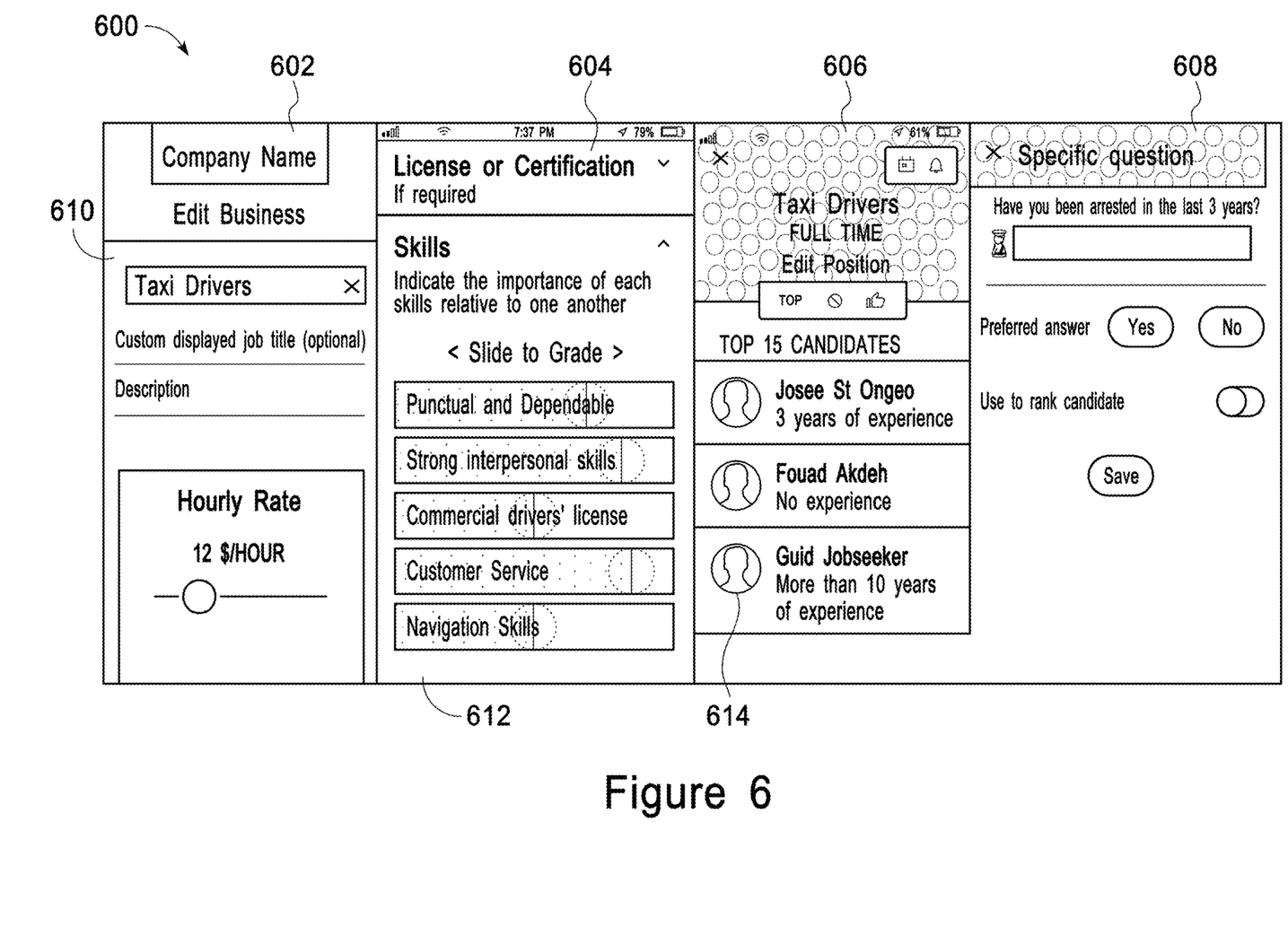
FIG. 6 Illustrates an example user interface for employers to add new jobs.

FIG. 6 illustrates an example user interface 600 for employers to add new jobs. On screen 602, the employer may configure a newly created job position. Input 610 allows the employer to select a job type within the taxonomy. The employer may also configure additional information like a custom title, job description, years of required experience, and hourly rate for the job. On screen 604, the employer may modify additional information for the job posting. This may include sections to configure desired schedules, certifications or licenses, or additional custom questions to be asked of the job-seeker. Screen 608 shows an example user interface for adding a new custom question to the job posting. The employer may indicate a preferred answer to the question and indicate if they would like the question to factor into the job-seeker's ranking. Input 612 allows the employer to emphasize the relative importance of skills associated with the job type. Additional information may be edited after the job has posted, and the system may update with the changes in real-time. After completing the job posting, the employers may see screen 606, where a list of top candidates 614 determined in real-time appears. The employer may then swipe left or right on the list of job-seekers to either keep or reject them as candidates. Based on the employer's behavior on accepting or rejecting candidates, the system uses machine learning to improve on its ranking of job-seekers. For example, if an employer accepts a candidate, the weights associated with that candidate's attributes are increased. If an employer rejects a candidate, the weights associated with that candidate's attributes are decreased.

Figure 7:
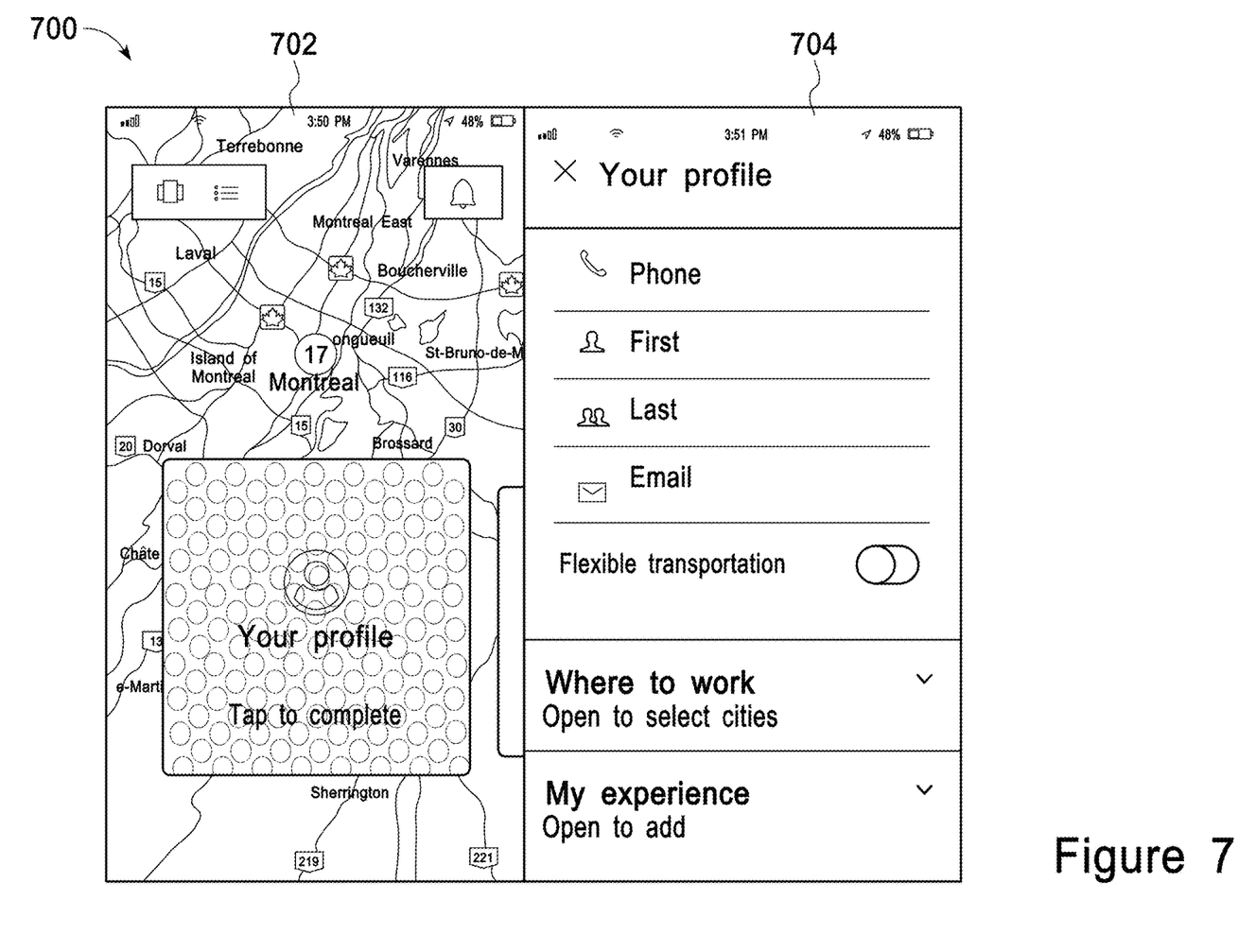
FIG. 7 Illustrates an example user interface for job-seekers to configure their profile.

FIG. 7 illustrates an example user interface 700 for job-seekers to configure their profile. On screen 702, the job-seeker can choose to edit their profile. On screen 704, the job-seeker enters information to complete their profile, such as their phone number, email address, and name. The job-seeker may also select which cities they would like to work and enter their work experience, including how long they worked in each position. When entering their experience, the system automatically suggests jobs from the taxonomy based on the job-seeker's profile. Finally, the job-seeker may have the option of answering additional custom questions created by the employer.

Figure 8:
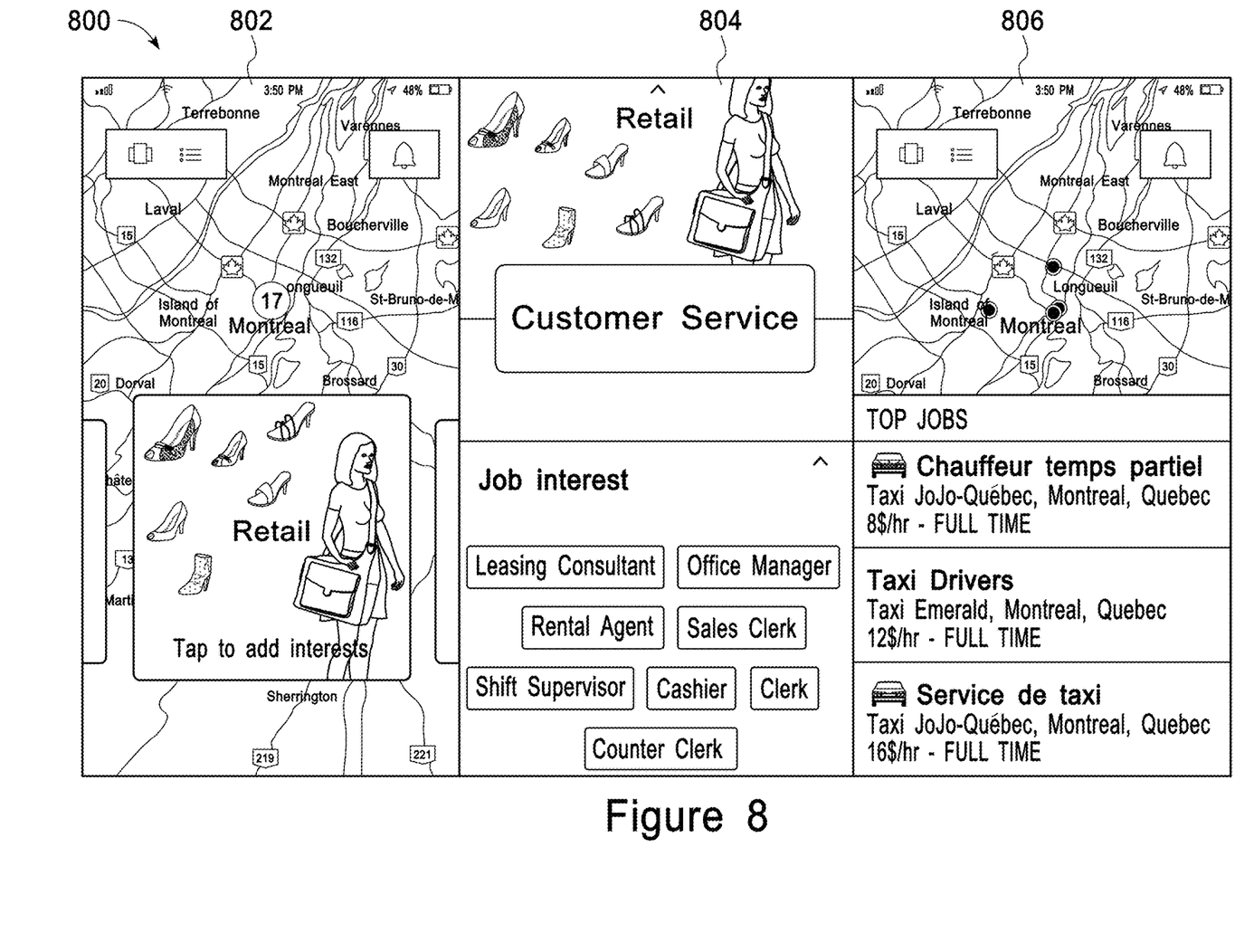
FIG. 8 Illustrates an example user interface for job-seekers to browse through the available job types in the taxonomy.

FIG. 8 illustrates an example user interface 800 for job-seekers to browse through the available job types in the taxonomy. On screen 802, job-seekers may swipe through different job verticals or categories. After selecting one, they see screen 804 which lists specific job interests or job types associated with the selected vertical or category. They may then select multiple job interests. Once their interests are selected, job-seekers may then see screen 806 which displays top jobs customized for their skills and interests. Once they select their interests, job-seekers also become visible to employers who are seeking to fill related job positions. The list of top jobs for a particular job-seeker is generated in real-time using the latest information available to the system. The taxonomy enables the transfer of skills to different job types because it allows experience to be transferred across industries (e.g. customer service experience may be counted as experience towards both a taxi-driver or retail manager position).

Figure 9:
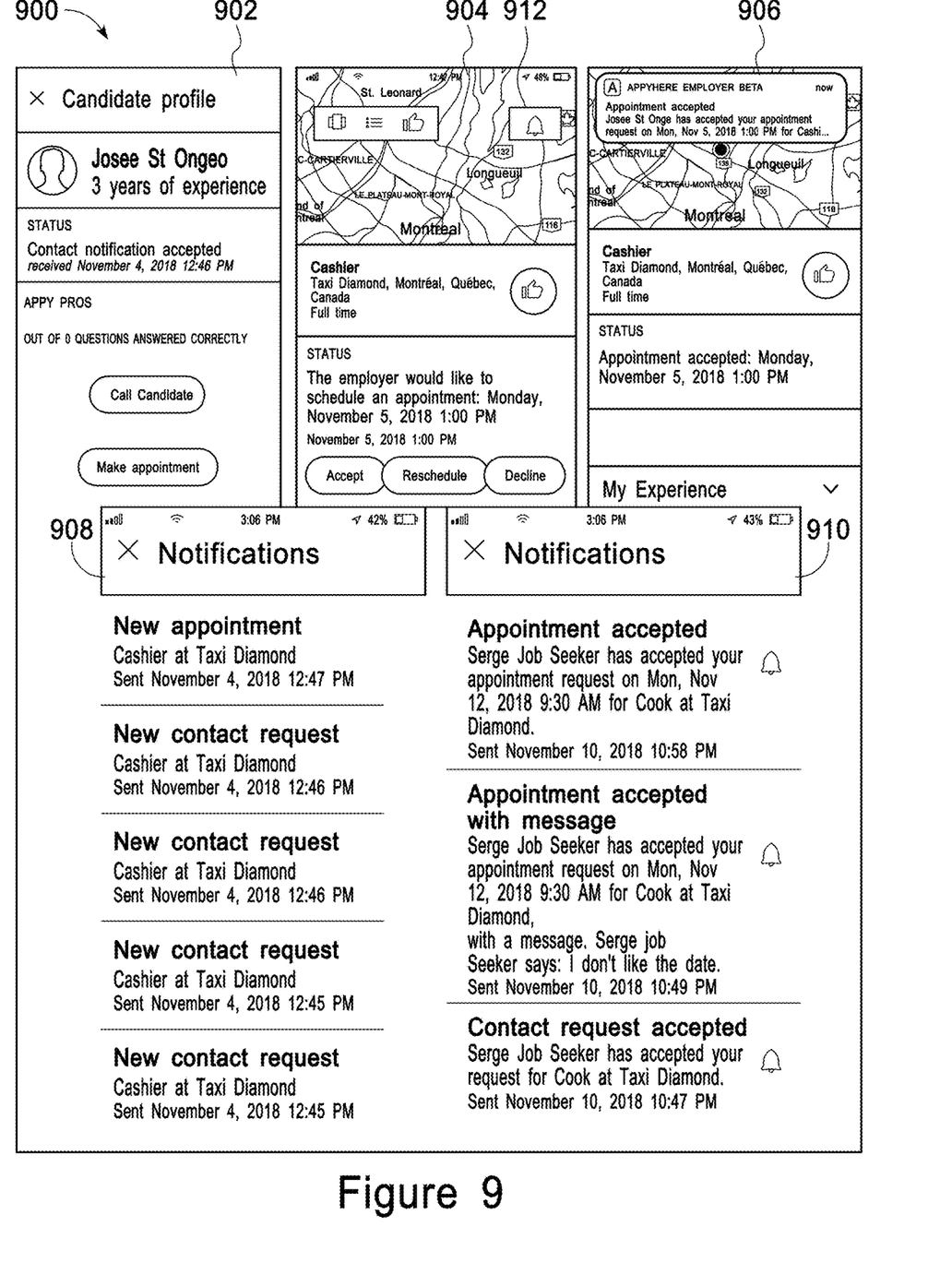
FIG. 9 Illustrates an example user interface for the communication process between job-seekers and employers.

FIG. 9 illustrates an example user interface 900 for the communication process between job-seekers and employers. If an employer initiates contact, the job-seeker may receive a system notification informing them of the contact request. Clicking on the notification then brings them to the application, where the job-seeker has the option to either accept or decline the request to communicate. The system may send reminders to the job-seeker if they have not responded in a given amount of time. The system also may send appointment reminders to the job-seeker. On a system notification and/or screen 902 of the employer UI, the employer sees that the job-seeker has accepted the request to communicate. The employer can then communicate with the job-seeker, for example by calling the candidate or scheduling an appointment. If the employer requests an appointment, the job-seeker may see the request in screen 904 of the job-seeker UI, and may have the option to accept, decline, or reschedule. On screen 906 of the employer UI, the employer can view the job-seeker's response to the scheduling request. To emphasize, both job-seeker and employer applications use the same notification system, which notifies them when a new action has taken place in the system.

The system uses two notification mechanisms: the operating system notifications that are native to a mobile device (e.g. Android or iOS notifications) and the application notifications that are managed within the system. The operating system notifications are not viewable once the job-seeker or employer has clicked on the notification, while the application notifications are persisted within the application. For example, in screen 904, the job-seeker may select button 912 which brings them to screen 908. Screen 908 shows a list of persisted application notifications that the job-seeker has received. Similarly, screen 910 shows the list of notifications received for the employer UI.

Figure 10:
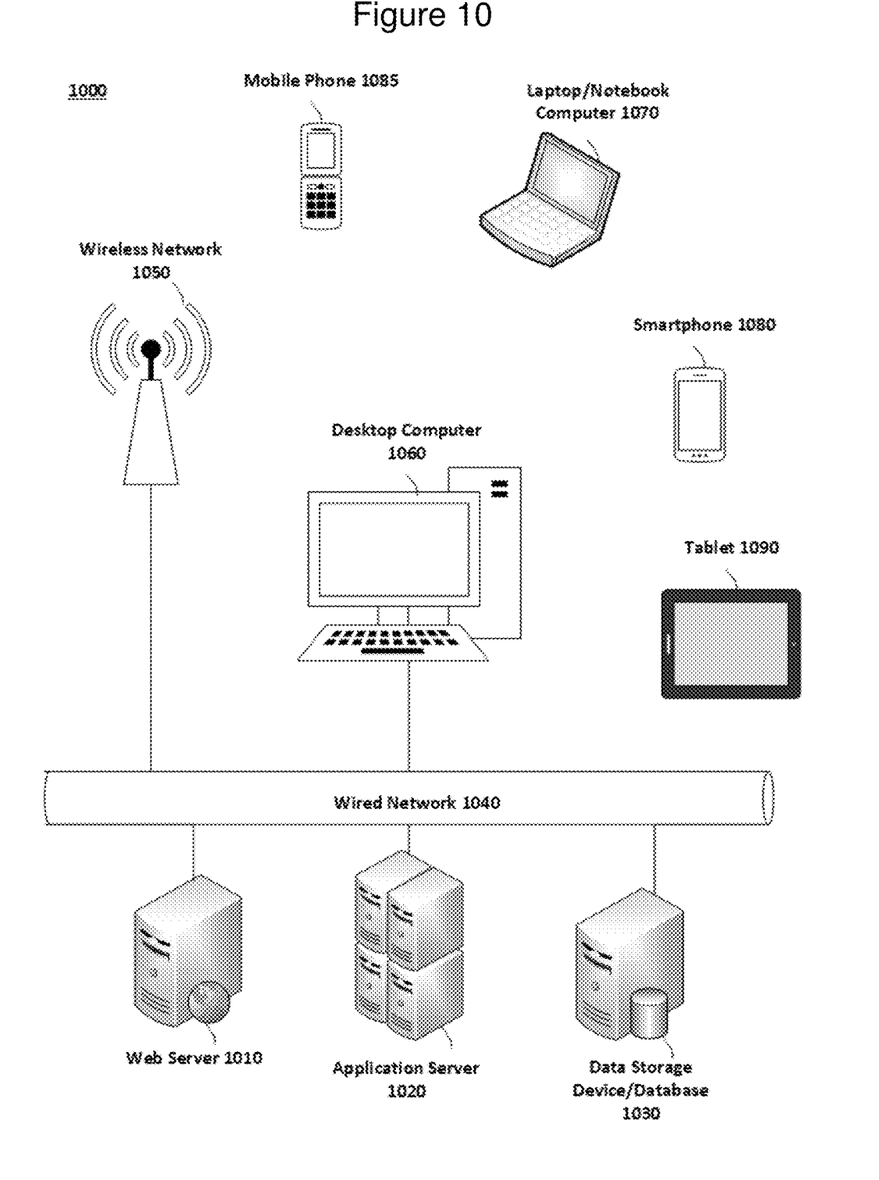
FIG. 10 Illustrates a block diagram of an example system, which may be used for implementations described herein.

FIG. 10 illustrates a block diagram of an example system 1000, which may be used for implementations described herein. Example system 1000 is capable of supporting or running various hardware and/or software modules and associated methods discussed with reference to implementations described herein. Note that certain implementations may be implemented using one or more standalone applications (for example, residing in a user device) and/or one or more web-based applications implemented using a combination of client-side and server-side code. While system 1000 performs implementations described herein, in other implementations, any suitable component or combination of components associated with system 1000 or any suitable processor or processors associated with system 1000 may facilitate performing the implementations described herein. In various implementations, system 1000 may not have all of the components shown and/or may have other elements including other types of components instead of, or in addition to, those shown herein.

General system 1000 includes user devices 1060-1090, including one or more desktop computers 1060, one or more notebook computers 1070, one or more smartphones 1080, one or more mobile phones 1085, and one or more tablets 1090. General system 1000 can interface with any type of user device, such as a thin-client computer, Internet enabled mobile telephone, mobile Internet access device, tablet, electronic book, or personal digital assistant, capable of displaying and navigating web pages or other types of electronic documents and UIs, and/or executing applications. Although system 1000 is shown with five user devices, any number of user devices can be supported. Some implementations of general system 1000 may include systems that run on a public cloud.

One or more web servers 1010 is used to process requests from web browsers and standalone applications for web pages, electronic documents, enterprise data or other content, and other data from the user computers. Web server 1010 may also provide push data or syndicated content, such as RSS feeds, of data related to enterprise operations.

One or more application servers 1020 operates one or more applications. The applications can be implemented as one or more scripts or programs written in any programming language, such as Java, C, C++, C #, or any scripting language, such as JavaScript or European computer manufacturers association script (ECMAScript), Perl, hypertext preprocessor (PHP), Python, Ruby, or tool command language (TCL). Applications can be built using libraries or application frameworks, such as Rails, Enterprise JavaBeans, or .NET. Web content may be created using hypertext markup language (HTML), cascading style sheets (CSS), and other web technology, including templating languages and parsers. Other implementations may use modern serverless managed services in the cloud (e.g. lambda services) to run the applications.

The data applications running on application server 1020 are adapted to process input data and user computer requests and can store or retrieve data from data storage device or database 1030. Database 1030 stores data created and used by the data applications. In some implementations, database 1030 includes a relational database that is adapted to store, update, and retrieve data in response to SQL format commands or other database query languages. Other implementations may use unstructured data storage architectures and Not Only SQL (NoSQL) databases.

In some implementations, application server 1020 includes one or more general purpose computers capable of executing programs or scripts. In some implementations, web server 1010 is implemented as an application running on one or more general purpose computers. Web server 1010 and application server 1020 may be combined and executed on the same computers.

An electronic communication network 1040-1050 enables communication between user computers 1060-1090, web server 1010, application server 1020, and database 1030. In some implementations, networks 1040-1050 may further include any form of electrical or optical communication devices, including wired network 1040 and wireless network 1050. Networks 1040-1050 may also incorporate one or more local-area networks, such as an Ethernet network, wide area networks, such as the Internet; cellular carrier data networks; and virtual networks, such as a virtual private network.

System 1000 is one example for executing applications according to some implementations. In some implementations, application server 1010, web server 1020, and optionally database 1030 can be combined into a single server computer application and system. In further implementations, virtualization and virtual machine applications may be used to implement one or more of application server 1010, web server 1020, and database 1030.

In still further implementations, all or a portion of the web and application serving functions may be integrated into an application running on each of the user computers. For example, a JavaScript application on the user computer may be used to retrieve or analyze data and display portions of the applications.

In various implementations, system 1000 may not have all of the components shown and/or may have other elements including other types of components instead of, or in addition to, those shown herein. For example, there may be a load balancer which interfaces between components of system 1000, or system 1000 may be implemented with a serverless managed service (e.g. lambda services).

Figure 11:
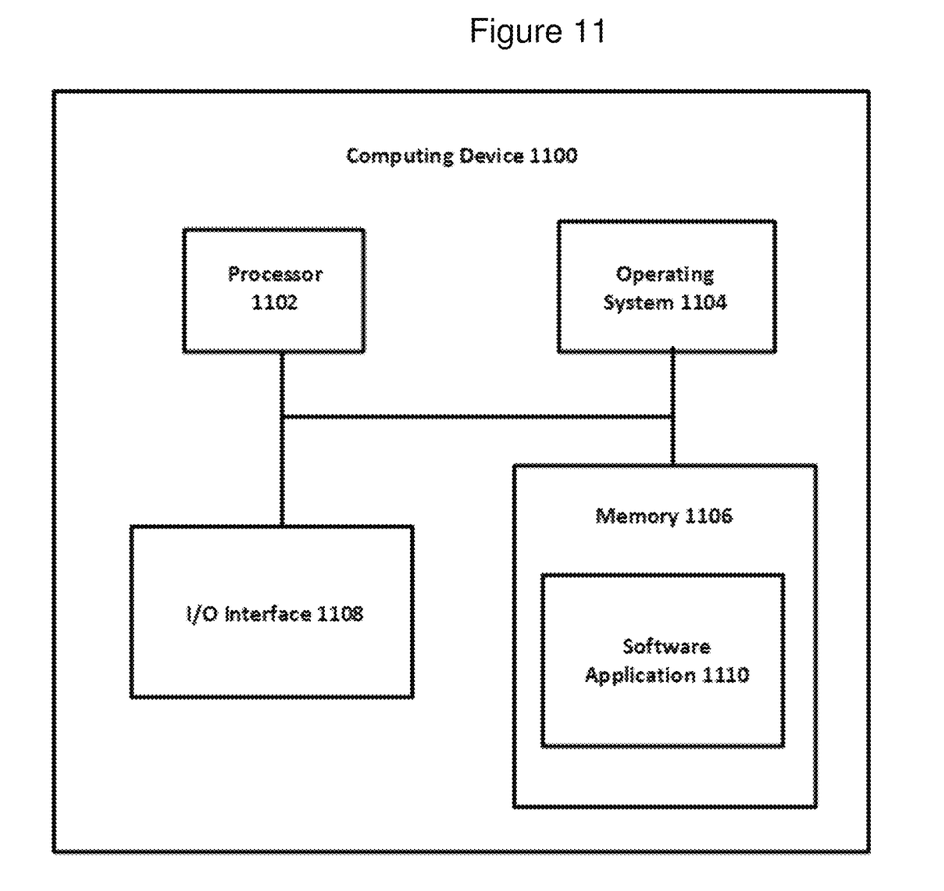
FIG. 11 Illustrates a general block diagram of a computing device usable to implement the embodiments described herein.

FIG. 11 is a general block diagram of a computing device 1100 usable to implement the embodiments described herein. While the computing device 1100 may be described as performing one or more of the steps in the embodiments herein, in other embodiments any suitable component or combination of components of the computing device 1100 or any suitable processor or processors associated with system 1100 may facilitate performing the steps.

FIG. 11 illustrates a block diagram of an example computing system 1100, which may be used for implementations described herein. For example, computing system 1100 may be used to implement user devices 1060-1090, and server devices 1010, 1020 of FIG. 10 as well as to perform the method implementations described herein. In some implementations, computing system 1100 may include a processor 1102, an operating system 1104, a memory 1106, and an input/output (I/O) interface 1108. In various implementations, processor 1102 may be used to implement various functions and features described herein, as well as to perform the method implementations described herein. While processor 1102 is described as performing implementations described herein, any suitable component or combination of components of system 1100 or any suitable processor or processors associated with system 1100 or any suitable system may perform the steps described. Implementations described herein may be carried out on a user device, on a server, or a combination of both.

Computing device 1100 also includes a software application 1110, which may be stored on memory 1106 or on any other suitable storage location or computer-readable medium. Software application 1110 provides instructions that enable processor 1102 to perform the functions described herein and other functions. The components of computing system 1100 may be implemented by one or more processors or any combination of hardware devices, as well as any combination of hardware, software, firmware, etc.

For ease of illustration, FIG. 11 shows one block for each of processor 1102, operating system 1104, memory 1106, I/O interface 1108, and software application 1110. These blocks 1102, 1104, 1106, 1108, and 1110 may represent multiple processors, operating systems, memories, I/O interfaces, and software applications. In various implementations, computing system 1100 may not have all of the components shown and/or may have other elements including other types of components instead of, or in addition to, those shown herein.

Although the description has been described with respect to particular embodiments thereof, these particular embodiments are merely illustrative, and not restrictive. For example, traits may be defined at a time of selection or designation by the job seeker or employer as opposed to being pre-defined.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer-readable storage medium carrying program instructions thereon, the instructions when executed by one or more processors of a common back end cause the one or more processors to perform operations comprising:
   receiving a list of candidates, wherein each candidate is associated with respective work experiences;
   accessing a taxonomy organized by industries, each including a plurality of job types describing tasks associated with respective jobs, skills, and a weighted mapping of the plurality of job types with the respective skills;
   providing to a first application of a recruiter device, a first sub list of job types from the plurality of job types of the taxonomy and at least one weight adjustment element associated with respective skills, to render on a recruiter graphical user interface (GUI) of the recruiter device;
   receiving a recruiter-selected job type from the first sub list of job types, wherein the recruiter-selected job type is relevant to a job position in a first industry;
   providing to a second application on a candidate client device, a second sub list of job types of the plurality of job types of the taxonomy, to render on a candidate graphical user interface (GUI) of the candidate client device, from which a first candidate selects a job type for a work experience of the first candidate;
   identifying from the plurality of job types in the taxonomy, predefined work skills associated with a first candidate-selected job type relevant to a second industry different from the first industry;

searching in different industries organized in the taxonomy, for matches of the work skills of the first candidate with other job types different from the first candidate-selected job type;

based on the searching, determining from the taxonomy that at least one of the work skills of the first candidate-selected job type in the second industry, matches predefined skills of the recruiter-selected job type in the first industry, wherein the recruiter-selected job type is different from the first candidate-selected job type;

performing a primary sorting of the candidates based, at least in part, on work skills of candidate job types for work experiences matching with the respective skills of the recruiter-selected job type;

performing a secondary sorting of the candidates based, at least in part, on at least one level of activity of the candidates with an application to generate a ranked candidate list, wherein the at least one level of activity comprises: responsiveness of the candidates to requests in the application and/or a number of jobs indicated as preferred by the candidates;

providing in real-time to the first application, a first ordered list of two or more of the candidates based on the ranked candidate list to render on a first portion of the recruiter GUI while the at least one weight adjustment element is rendered on a second portion of the recruiter GUI;

processing a change in one or more weight adjustment elements of the at least one weight adjustment element received from the recruiter device, resulting in a change in the ranked candidate list; and providing a second ordered list of two or more candidates based on the change in the ranked candidate list, to the recruiter device to render on the first portion of the recruiter GUI and replace the first ordered list while the at least one weight adjustment element is rendered on the second portion of the recruiter GUI.

2. The computer-readable storage medium of claim 1, wherein sorting the candidates based on the respective work experiences, comprises:

receiving a recruiter-defined desired time of experience for the job position;

computing a score for each candidate based on the respective work experiences; and determining a proficiency level in a particular skill for the first candidate using a time of experience in the particular skill of the first candidate, wherein a gain in the proficiency level for the first candidate as compared to a second candidate having less time of experience than the first candidate, decreases as the time of experience of the first candidate increases.

3. The computer-readable storage medium of claim 1, wherein the at least one level of activity further comprises: how often the candidates show up to appointments that have been scheduled within the application.

4. The computer-readable storage medium of claim 3, wherein the at least one level of activity is within a time period that is recruiter-defined.

5. The computer-readable storage medium of claim 3, wherein the at least one level of activity is within a time period that is a default value defined by the application.

6. The computer-readable storage medium of claim 3, wherein the requests include notifications generated by the application.

7. The computer-readable storage medium of claim 3, wherein the requests are for scheduling an interview.

8. The computer-readable storage medium of claim 1, further comprising ranking the candidates based, at least in part, on the primary sorting and the secondary sorting, by a machine learning model to output the ranked candidate list.

9. The computer-readable storage medium of claim 8, further comprising:

receiving recruiter-selected one or more candidates from the list of candidates for the recruiter-selected job type and recruiter-rejected one or more candidates from the list of candidates for the recruiter-selected job type;

providing the recruiter-selected one or more candidates to the machine learning model to generate the ranked candidate list, as feedback for training of the machine learning model; and altering weights associated with job-agnostic attributes of the recruiter-selected job type, based on the feedback.

10. The computer-readable storage medium of claim 1, wherein providing in real-time, information regarding one or more of the candidates comprises enabling a user interface to display the candidates.

11. The computer-readable storage medium of claim 1, wherein the operations further comprise withholding information describing the skills mapped to the respective job types of the second sub list from the candidate client device.

12. The computer-readable storage medium of claim 1, wherein identifying the work skills is performed without use of skills information provided from the first candidate.

13. The computer-readable storage medium of claim 1, wherein each of the at least one weight adjustment element defines an importance value of a specific skill.

14. A method for ranking job candidates, the method comprising:

receiving a list of candidates, wherein each candidate is associated with respective work experiences;

accessing a stored taxonomy organized by industries, each including a plurality of job types describing tasks associated with respective jobs, job-agnostic attributes, and a weighted mapping of the plurality of job types with the respective skills;

providing to a first application of a recruiter device, a first sub list of job types from the plurality of job types of the taxonomy and at least one weight adjustment element associated with respective skills, to render on a recruiter graphical user interface (GUI) of the recruiter device;

providing to a second application on a candidate client device, a second sub list of job types of the plurality of job types of the taxonomy, to render on a candidate graphical user interface (GUI) of the candidate client device, from which a first candidate selects a job type for a work experience of the first candidate;

identifying from the plurality of job types in the taxonomy, predefined work skills associated with a first candidate-selected job type relevant to a second industry different from the first industry;

searching in different industries organized in the taxonomy, for matches of the work skills of the first candidate with other job types different from the first candidate-selected job type;

based on the searching, determining from the taxonomy that at least one of the work skills of the first candidate-selected job type in the second industry, matches predefined skills of a recruiter-selected job type in the first industry, wherein the recruiter-selected job type is different from the first candidate-selected job type;

performing a primary sorting of the candidates based, at least in part, on work skills of candidate job types for work experiences matching with the respective of the recruiter-selected job type;

performing a secondary sorting of the candidates based, at least in part, on at least one level of activity of the candidates with an application to generate a ranked candidate list, wherein the at least one level of activity comprises: responsiveness of the candidates to requests in the application and/or a number of jobs indicated as preferred by the candidates;

providing in real-time to the first application, a first ordered list of two or more of the candidates based on the ranked candidate list to render on a first portion of the recruiter GUI while the at least one weight adjustment element is rendered on a second portion of the recruiter GUI;

processing a change in one or more weight adjustment elements of the at least one weight adjustment element received from the recruiter device, resulting in a change in the ranked candidate list; and providing a second ordered list of two or more candidates based on the change in the ranked candidate list, to the recruiter device to render on the first portion of the recruiter GUI and replace the first ordered list while the at least one weight adjustment element is rendered on the second portion of the recruiter GUI.

15. The method of claim 14, wherein sorting the candidates based on work experience of the candidates comprises:
receiving a recruiter-defined desired time of experience for the job;
computing a score for each candidate based on work experience of the candidates; and
determining a proficiency level in a particular skill for a first candidate using a time of experience in the particular skill of a first candidate, wherein a gain in the proficiency level for the first candidate as compared to a second candidate having less time of experience than the first candidate, decreases as the time of experience of the first candidate increases.

16. The method of claim 15, wherein the respective work experiences further include direct work experience which directly matches the recruiter-selected job type.

17. The method of claim 14, wherein refining the sorting based on engagement of the candidates with the application comprises:
the at least one level of activity further comprises: how often the candidates show up to appointments that have been scheduled within the application.

18. The method of claim 17, wherein the at least one level of activity is within a time period that is recruiter-defined.

19. The method of claim 17, wherein the at least one level of activity is within a time period that is a default value defined by the application.

20. The method of claim 17, wherein the requests include notifications generated by the application.

21. The method of claim 17, wherein the requests are sent by recruiters.

22. An apparatus comprising:
one or more processors; and
logic encoded in one or more non-transitory computer-readable storage media for execution by the one or more processors of a common back end, and when executed operable to perform operations comprising:
receiving a list of candidates, wherein each candidate is associated with respective work experiences;

accessing a taxonomy organized by industries, each including a plurality of job types describing tasks associated with respective jobs, skills, and a weighted mapping of the plurality of job types with the respective skills;

providing to a first application of a recruiter device, a first sub list of job types from the plurality of job types of the taxonomy and at least one weight adjustment element, each defining an importance of specific skills, to render on a recruiter graphical user interface (GUI) of the recruiter device;

receiving a recruiter-selected job type from the plurality of job types of the stored taxonomy, wherein the recruiter-selected job type is relevant to a job position in a first industry;

providing to a second application on a candidate client device, a second sub list of job types of the plurality of job types of the taxonomy, to render on a candidate graphical user interface (GUI) of the candidate client device, from which the candidate selects job type for a work experience of the candidate;

identifying from the plurality of job types in the taxonomy, predefined work skills associated with a first candidate-selected job type relevant to a second industry different from the first industry;

searching in different industries organized in the taxonomy, for matches of the work skills of the first candidate with other job types different from the first candidate-selected job type;

based on the searching, determining from the taxonomy that at least one of the work skills of the first candidate-selected job type in the second industry, matches predefined skills of the recruiter-selected job type in the first industry, wherein the recruiter-selected job type is different from the first candidate-selected job type;

performing a primary sorting the candidates based, at least in part, on work skills of candidate job types for work experiences matching with a respective skill;

performing a secondary sorting of the candidates based, at least in part, on at least one level of activity of the candidates with an application to generate a ranked candidate list, wherein the at least one level of activity comprises: responsiveness of the candidates to requests in the application and/or a number of jobs indicated as preferred by the candidates;

providing in real-time to the first application, a first ordered list of two or more of the candidates based on the ranked candidate list to render on a first portion of the recruiter GUI while the at least one weight adjustment element is rendered on a second portion of the recruiter GUI;

processing a change in one or more weight adjustment elements of the at least one weight adjustment element received from the recruiter device, resulting in a change in the ranked candidate list; and providing a second ordered list of two or more candidates based on the change in the ranked candidate list, to the recruiter device to render on the first portion of the recruiter GUI and replace the first ordered list while the at least one weight adjustment element is rendered on the second portion of the recruiter GUI.

* * * * *